United States Patent
Oowada

(10) Patent No.: US 9,429,413 B2
(45) Date of Patent: Aug. 30, 2016

(54) POSITION DETECTION DEVICE

(71) Applicant: DENSO CORPORATION, Kariya, Aichi-pref. (KR)

(72) Inventor: Takahumi Oowada, Kariya (JP)

(73) Assignee: DENSO CORPORATION, Kariya (JP)

( * ) Notice: Subject to any disclaimer, the term of this patent is extended or adjusted under 35 U.S.C. 154(b) by 720 days.

(21) Appl. No.: 13/845,929

(22) Filed: Mar. 18, 2013

(65) Prior Publication Data

US 2013/0262009 A1 Oct. 3, 2013

(30) Foreign Application Priority Data

Mar. 27, 2012 (JP) .................. 2012-072040

(51) Int. Cl.
| | | |
|---|---|---|
| *G01C 17/38* | (2006.01) | |
| *G01B 7/30* | (2006.01) | |
| *G01D 5/20* | (2006.01) | |
| *G01D 5/244* | (2006.01) | |

(52) U.S. Cl.
CPC ............... *G01B 7/30* (2013.01); *G01D 5/2073* (2013.01); *G01D 5/2448* (2013.01)

(58) Field of Classification Search
CPC ..... G01B 7/30; G01D 5/2073; G01D 5/2448
USPC .......................................................... 702/94
See application file for complete search history.

(56) References Cited

U.S. PATENT DOCUMENTS

| | | | | |
|---|---|---|---|---|
| 5,430,362 A | * | 7/1995 | Carr | ........................ F02N 11/04 318/139 |
| 6,278,388 B1 | | 8/2001 | Kushihara | |
| 7,759,897 B2 | * | 7/2010 | Piippo | ..................... H02P 6/183 318/700 |
| 2010/0097052 A1 | | 4/2010 | Lillestolen et al. | |
| 2012/0010849 A1 | | 1/2012 | Yamada | |

FOREIGN PATENT DOCUMENTS

| | | |
|---|---|---|
| JP | 62-172218 | 7/1987 |
| JP | 11-118520 | 4/1999 |

(Continued)

OTHER PUBLICATIONS

Office Action (1 page) dated Feb. 18, 2014, issued in corresponding Japanese Application No. 2012-072040 and English translation (1 page).

(Continued)

*Primary Examiner* — Tung S Lau
*Assistant Examiner* — Xiuquin Sun
(74) *Attorney, Agent, or Firm* — Nixon & Vanderhye P.C.

(57) ABSTRACT

In a position detection device, an amplitude modulation is executed for AC excitation signals Sc using modulation wave signals. Differential amplifiers execute a voltage conversion of the modulated wave signal Sin, Cos to digital data SIN, COS and transmit them to a microcomputer. The microcomputer multiplies the modulated wave signals SIN, COS with parameters cos ϕ, sin ϕ, and executes a subtraction of the multiplied value to obtain an error-correlation value ϵ. An angle calculations section in the microcomputer receives a detected value ϵc obtained by multiplying the error-correlation value ϵ with a binary detection signal Rd. The binary detection signal Rd corresponds to a positive sign or a negative sign of the signal Sc. The sampling time of the AC excitation signal Sc is set to a time at which an absolute value of the AC excitation signal Sc exceeds a regulated value.

18 Claims, 7 Drawing Sheets

(56) References Cited

FOREIGN PATENT DOCUMENTS

| | | |
|---|---|---|
| JP | 3442316 | 6/2003 |
| JP | 2006-023146 | 1/2006 |
| JP | 2007-315856 | 12/2007 |
| JP | 2010-096750 | 4/2010 |
| JP | 2011-141207 | 7/2011 |

OTHER PUBLICATIONS

Office Action (1 page) dated Nov. 4, 2014, issued in corresponding Japanese Application No. 2012-072040 and English translation (2 pages).

* cited by examiner

PHASE OF INPUT EXCITATION SIGNAL Sc AT SAMPLING TIMING

POSITION DETECTION DEVICE

CROSS-REFERENCE TO RELATED APPLICATION

This application is related to and claims priority from Japanese Patent Application No. 2012-72040 filed on Mar. 27, 2012, the contents of which are hereby incorporated by reference.

BACKGROUND OF THE INVENTION

1. Field of the Invention

The present disclosure relates to position detection devices capable of receiving a modulated wave signal obtained by an amplitude modulation of an alternating current excitation signal (AC excitation signal) on the basis of position information of a target detection device, and demodulating the position information from the received modulated wave by using a plurality of sampling values of the modulated wave during one period of the AC excitation signal.

2. Description of the Related Art

For example, a patent document, Japanese patent JP 3442316 discloses a conventional resolver digital converter (RDC), as a position detection device of this type, capable of providing digital data regarding rotation detection angle information of a rotating device, which is a detection target, on the basis of modulated wave signals. These modulated wave signals are obtained by a resolver which executes an amplitude modulation of an excitation signal according to a rotation detection angle of the rotating device.

However, if the function of the position detection device is realized by using software programs, an operation speed of which is lower than an operation speed of a hardware device assembly, the inventors according to the present invention found that this structure using the software programs drastically decreases noise immunity.

SUMMARY

It is therefore desired to provide a position detection device having a structure capable of receiving one or more modulated wave signals, obtained by an amplitude modulation of an alternating current excitation signal on the basis of position information of a target detection device, and demodulating the position information from one or more the modulated wave signals by using a plurality of sampling values of the modulated wave signals during one period of the alternating current excitation signal.

An exemplary embodiment provides a position detection device having a demodulation section. The demodulation section receives one or more modulated wave signals. The modulated wave signal is obtained by an amplitude modulation of an alternating current excitation signal on the basis of position information of a target detection device to be detected. The demodulation section demodulates the position information from one or more the modulated wave signals by using a plurality of sampling values of one or more the modulated wave signals during a period of the alternating current excitation signal. The demodulation section has an alternating current excitation signal sampling section, a detection section and an avoidance section. The alternating current excitation signal sampling section executes the sampling of the alternating current excitation signal. The detection section receives an output of the alternating current excitation signal sampling section, and executes an eliminating process of eliminating an influence caused by a sign of the alternating current excitation signal from the position information when the position information is demodulated from one or more the inputted modulated wave signals. The avoidance section avoids using the alternating current excitation signal in the demodulation of the position information when an absolute value of the alternating current excitation signal is not more than a regulated value.

There is a possibility of causing a difference by a time length counted from the sampling time of the modulated wave signal which corresponds to the sampling of the alternating current excitation signal when an absolute value of the alternating current excitation signal is not more than the regulated value, where the difference is generated between a sign of the AC excitation signal Sc contained in the modulated samples signal and a sign of the sampled AC excitation signal Sc. In addition to this, when noise is added to the sampled AC excitation signal Sc, there is a possibility of often generating a difference between a sign of the AC excitation signal Sc contained in the sampled and modulated signal and a sign of the sampled AC excitation signal Sc. The avoidance section avoids the influence caused by the above difference from the demodulation of the position information.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
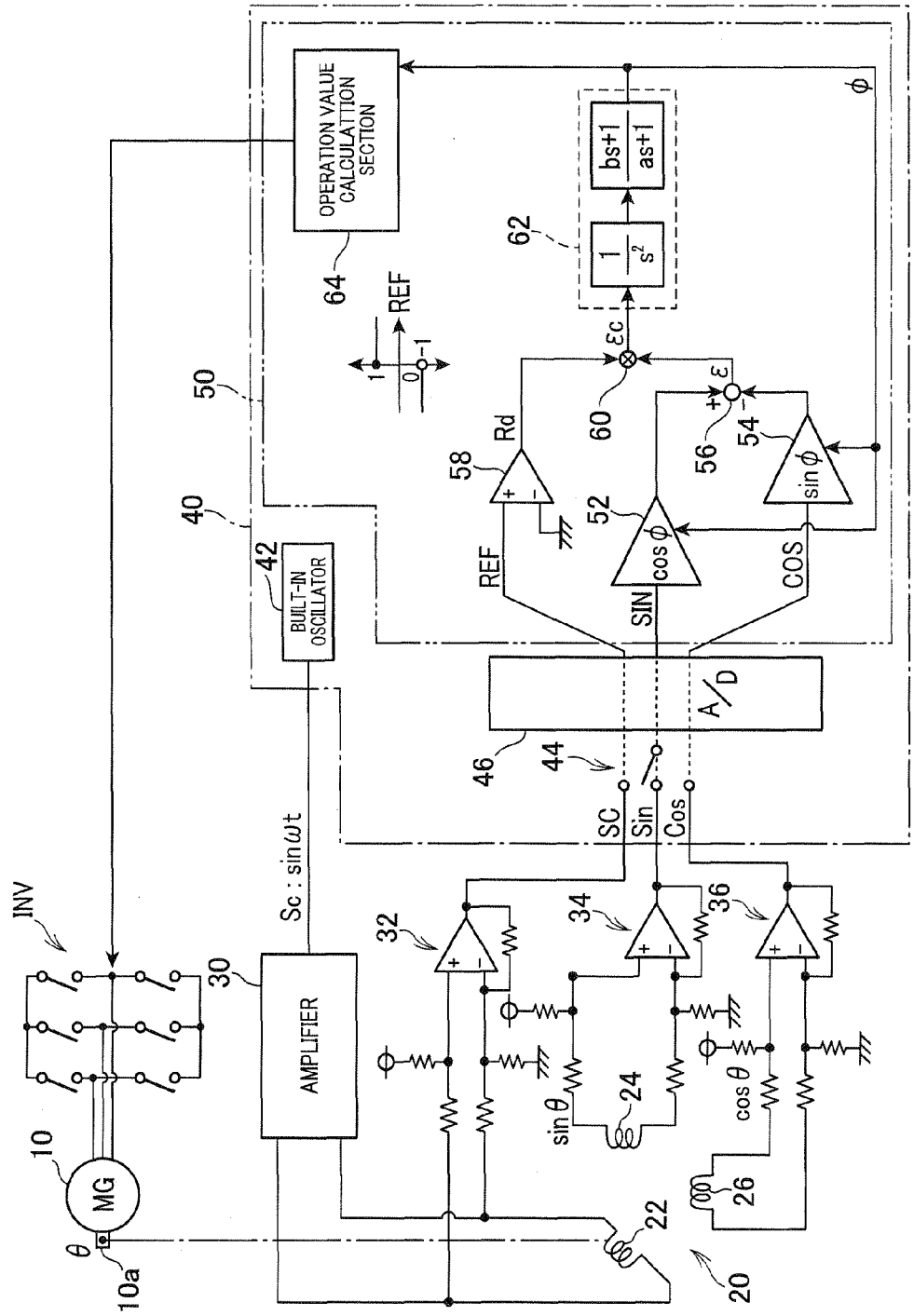
FIG. 1 is a view showing a configuration of a position detection device according to a first exemplary embodiment of the present invention.

Hereinafter, various embodiments of the present invention will be described with reference to the accompanying drawings. In the following description of the various embodiments, like reference characters or numerals designate like or equivalent component parts throughout the several diagrams.

First Exemplary Embodiment

A description will be given of a position detection device according to the first exemplary embodiment of the present invention with reference to FIG. 1 and FIG. 2. The first exemplary embodiment shows an example in which the position detection device is used in a resolver digital converter or a resolver digital encoder.

FIG. 1 is a view showing a configuration of a position detection device according to the first exemplary embodiment. As shown in FIG. 1, a motor generator 10 mounted to a motor vehicle (not shown) is used as a main engine of the motor vehicle. The motor generator 10 is mechanically connected to a wheel shaft (not shown). An inverter INV transmits electric power between the motor generator 10 and a battery (not shown). A rotor 10a of the motor generator 10 is mechanically connected to a primary coil 22 of the resolver 20.

The primary coil 22 is excited by an alternating current (AC) excitation signal Sc having a sine curve transmitted from a microcomputer 40 with a built-in oscillator 42. In more detail, the AC excitation signal Sc is transmitted to an amplification circuit 30. When receiving and amplifying the AC excitation signal Sc, the amplification circuit 30 transmits the amplified AC excitation signal Sc to the primary coil 22.

Magnet flux generated in the primary coil 22 by the amplified AC excitation signal Sc is interlinked with a pair of secondary coils 24 and 26. The primary coil 22 and the pair of the secondary coils 24 and 26 are configured to change a mutual inductance thereof periodically on the basis of an electric angle (a rotation angle θ, as position information) of the rotor 10a of the motor generator 10 as the detection target. This configuration makes it possible to periodically change the number of magnetic fluxes interlinked to the secondary coils 24 and 26. In particular, the position detection device according to the first exemplary embodiment generates a voltage in the secondary coil 24 and a voltage in the secondary coil 26 so that a phase difference between the voltage generated in the secondary coil 24 and the voltage generated in the secondary coil 26 is shifted by π/2. This makes it possible for the output voltage of each of the secondary coils 24 and 26 to have a modulated wave signal obtained by modulating the AC excitation signal Sc by a modulation wave signal sin θ and a modulation wave signal cos θ, respectively. When the excitation signal Sc is sin ωt, the modulated wave signals of the secondary coils 24 and 26 can be expressed by sin θ·sin ωt and cos θ·cos ωt, respectively.

A differential amplification circuit 32 converts the outputs transmitted from the amplification circuit 30 to an input excitation signal SC. As shown in FIG. 1, an analogue to digital converter (AD converter) 46 receives the input excitation signal SC.

On the other hand, a differential amplification circuit 32 receives an output voltage of the secondary coil 24, and converts the received output voltage to a modulated wave signal Sin. A differential amplification circuit 36 receives an output voltage of the secondary coil 26, and converts the received output voltage to a modulated wave signal Cos. That is, the microcomputer 40 receives the input excitation signal SC, the modulated wave signal Sin and the modulated wave signal Cos. The AD converter 46 receives, in time division, respectively, under the control of a selector 44 in the microcomputer 40, the input excitation signal SC, the modulated wave signal Sin and the modulated wave signal Cos.

The AD converter 46 converts the received input excitation signal SC to digital data items (by sampling the AC excitation signal Sc) as reference signal REF. The AD converter 46 converts the received modulated wave signal Sin to digital data items (by sampling the modulated wave signal Sin) as the modulated wave signal SIN. Similarly, the AD converter 46 converts the received modulated wave signal Cos to digital data items (by sampling the modulated wave signal Cos) as the modulated wave signal COS.

A central processing unit (CPU) 50 receives the output signals transmitted from the AD converter 46. The programs stored in the CPU 50 process the received input signals such as the reference signal REF, the modulated wave signal SIN and the modulated wave signal COS.

The block diagram of the CPU 50 shown in FIG. 1 shows a process of calculating a rotation detection angle θ of the rotor 10a of the motor generator 10.

That is, as shown in FIG. 1, a multiplier 52 multiplies a cosine function cos φ and the modulated wave signal SIN, where the cosine function cos φ uses a calculation value (calculated angle φ) of the rotation detection angle θ of the rotor 10a of the motor generator 10 as an independent variable.

On the other hand, a multiplier 54 multiplies a sine function sin φ and the modulated wave signal COS, where the sine function sin φ uses a calculation value (calculated angle φ) of the rotation detection angle θ of the rotor 10a of the motor generator 10 as an independent variable.

An error correlation calculation section 56 subtracts the output value of the multiplier 52 from the output value of the multiplier 54 in order to calculate an error correlation value ε.

The error correlation value ε can be expressed by the following equation (c1), neglecting a proportional coefficient determined by a gain of the differential amplification circuits 32, 24 and 36 and the amplification circuit 30:

$$\text{Error correlation value } \varepsilon = \sin\omega t \cdot \sin\theta \cdot \cos\Phi - \sin\omega t \cdot \cos\theta \cdot \sin\Phi \quad (c1)$$
$$= \sin\omega t \cdot \sin(\theta - \Phi).$$

When a difference between the actual rotation detection angle θ of the rotor 10a of the motor generator 10 and the calculated angle φ becomes zero, the error correlation value ε becomes zero. In addition, when eliminating an influence caused by a magnitude of the AC excitation signal Sc, an absolute value of the error correlation value ε becomes a same value regardless of a sign of the AC excitation signal Sc so long as the absolute value of the error correlation value ε is changed according to a difference between the calculated angle φ and an actual rotation detection angle θ of the rotor 10a and the difference thereof has a same value. Still further, when eliminating an influence caused by a sign of the AC excitation signal Sc (a sign of "sin ωt"), the error correlation value ε is a variable indicating whether or not the calculated angle φ is an advance angle or a retard angle from a calculated angle φ. A process of eliminating such influence caused by a sign of the AC excitation signal Sc from the error correlation value ε is executed by a synchronous detection.

That is, the AD converter 46 transmits the reference signal REF to a detection signal generation section 58 as a binary detection signal calculation section. The detection signal generation section 58 generates a detection signal Rd having a value of 1 or −1 on the basis of a sign of the received reference signal REF. In more detail, the detection signal generation section 58 generates the detection signal Rd having a value of 1 when the received reference signal REF is not less than zero. Further, the detection signal generation section 58 generates the detection signal Rd having a value of −1 when the received reference signal REF is less than zero. On the other hand, a synchronous detection section 60 multiplies the error correlation value ϵ and the detection signal Rd in order to calculate a detected value ϵc.

The detected value ϵc is a parameter having a value of zero when a difference between the actual rotation detection angle θ of the rotor 10a and the calculated angle ϕ is zero. Further, the detected value ϵc is also a parameter indicating an advance angle or a retard angle on the basis of a sign of the difference between the actual rotation detection angle θ of the rotor 10a and the calculated angle ϕ.

An angle calculation section 62 receives the detected value ϵc transmitted from the synchronous detection section 60. In general, the angle calculation section 62 is comprised of a low pass filter and an integrating section. The first exemplary embodiment shown in FIG. 1 uses the angle calculation section 62 comprised of a double integral section (1/s$^2$) and a phase compensation filter (bs+1)/(as +1). The angle calculation section 62 uses the double integral section (1/s$^2$) because the calculated angle ϕ does not have a stationary error when the rotation detection angle θ of the rotor 10a is changed at a constant speed.

The calculated angle ϕ is also transmitted to an operation value calculation section 64 in addition to the multiplier 52 and the multiplier 54. The operation value calculation section 64 generates an operation signal on the basis of a current detection value of a current sensor (not shown) and the calculated angle ϕ. The current sensor (not shown) detects the current flowing in the motor generator 10. The operation value calculation section 64 outputs the operation signal to the inverter INV in order to adjust a control value (for example, an output torque) of the motor generator 10 to an instruction value indicated by the operation signal.

By the way, the inventors according to the present invention found that the noise immunity is drastically decreased or deteriorated when the microcomputer 40 (namely, the CPU 50) acts as a calculation section to execute a control program in order to calculate the calculated angle ϕ, and when a calculation speed of the calculated angle ϕ is low.

For example, when noise is added on the input excitation signal SC and a sign of the reference signal REF becomes different from a sign of an actual AC excitation signal Sc, the difference drastically affects the accuracy of the calculated angle ϕ because the CPU 50 executes a software program in order to obtain the calculated angle ϕ. The execution of the software program needs to use a low frequency wave (for example, not more than 200 kHz), and a sampled value (as the reference signal REF) per one sampling timing drastically affects the accuracy of the calculated angle ϕ.

Using the microcomputer 40 comprised of the CPU 50 has low noise immunity because there is an imbalance due to a difference between the sampling number of samples of the reference signal REF having a positive value and the sampling number of samples of the reference signal REF having a negative value during one sampling period. That is, the detected value ϵc has a value of K·|sin ωt|·sin(θ−ϕ) by using a proportional constant K (>0) which is determined by gains of the differential amplification circuits 32, 34 and 36. Accordingly, the calculated angle ϕ is not affected, as long as noise is added into the reference signal REF, from a matter due to a difference between the sampling number of samples of the reference signal REF having a positive value and the sampling number of samples of the reference signal REF having a negative value during one sampling period.

However, when noise is added into the signals supplied to the differential amplification circuit 36, and the noise is designated by an offset value δ, the detected value ϵc can be expressed by a following formula (c2):

$$\epsilon c = K \cdot |\sin \omega t| \cdot \sin(\theta - \phi) - \sin \phi \cdot \delta \cdot Rd / |Rd| \qquad (c2).$$

The second right term in the formula (c2) is a value having a sign determined by the detection signal Rd. Accordingly, when a difference between the sampling number of samples of the detection signal Rd having a positive value and the sampling number of samples of the detection signal Rd having a negative value becomes zero during a noise added period, an average value of the second right term in the formula (c2) becomes zero. On the other hand, when the difference is not zero, namely, when the difference between the sampling number of samples of the detection signal Rd having a positive value and the sampling number of samples of the detection signal Rd having a negative value does not become zero, an average value of the second right term in the formula (c2) does not zero. In particular, because the first exemplary embodiment uses the angle calculation section 62 comprised of the double integral section (1/s$^2$), the interference caused by the difference of the sampling number of samples of the detection signal Rd is increased.

For example, when a calculation period of calculating the calculated angle ϕ (namely, the sampling period such as the reference signal REF, etc.) is fixed, and when the sampling number of samples of the detection signal Rd having a positive value is greater than the sampling number of samples of the detection signal Rd having a negative value, a phenomenon is caused later, in which when the sampling number of samples of the detection signal Rd having a negative value is greater than that of the detection signal Rd having a positive value. In this case, when the calculation period of calculating the calculated angle ϕ has a long time period, there is a possibility of having the difference of zero, namely, there is not caused an imbalance between the sampling number of samples of the detection signal Rd having a positive value and the sampling number of samples of the detection signal Rd having a negative value. This means that the accuracy of calculating the calculated angle ϕ is affected by the time taken to calculate the calculated angle ϕ.

By the way, it is possible to adjust the time constant of the low pass filter of the phase compensation filter (bs+1)/(as +1) in the angle calculation section 62 in order to eliminate the interference caused by the presence of noises during this time scale. However, this makes it possible to decrease a responsiveness of the angle calculation section 62. Because a vehicle built-in device is required to have a high responsiveness, it is difficult to use the above measure to adjust the time constant of the low pass filter of the phase compensation filter (bs+1)/(as +1) in the angle calculation section 62.

When a calculation period (as the sampling period of samples of the reference signal REF, etc.) of calculating the calculated angle ϕ, the noise immunity is decreased by the imbalance between the sampling number of samples of the detection signal Rd having a positive value and the sampling number of samples of the detection signal Rd having a negative value. In other words, when the calculation period of calculating the calculated angle φ becomes an adequately short time period, the second right term in the formula (c2) does not affect the accuracy of calculating the calculated angle φ. For example, when the AC excitation signal Sc has a period of 100 μs and the period of calculating the calculated angle φ is a period of 6 μs, the sampling number of samples during a half period of the AC excitation signal Sc becomes 8 or 9. On the other hand, when the AC excitation signal Sc has a period of 100 μs and the period of calculating the calculated angle CD is a period of 0.6 μs, the sampling number of samples during a half period of the AC excitation signal Sc becomes 83 or 84. In both the cases, a difference in number between the reference signal REF having a positive value and the reference signal REF having a negative value becomes one (a value of 1). However, a calculation accuracy of calculating the calculated angle φ is greatly affected by such a value of 1 in both the cases.

Further, the structure of the position detection device according to the first exemplary embodiment shown in FIG. 1 easily causes a detection error in which a sign of the detection signal Rd is different from a sign of the AC excitation signal Sc contained in the modulated wave signal SIN and the modulated wave signal COS. That is, because the AD converter 46 in the position detection device shown in FIG. 1 executes the time division sampling process of the input excitation signal SC, the modulated wave signal SIN and the modulated wave signal COS, there is a possibility of generating a sampling lag time between the input excitation signal SC, the modulated wave signal SIN and the modulated wave signal COS.

Figure 2:
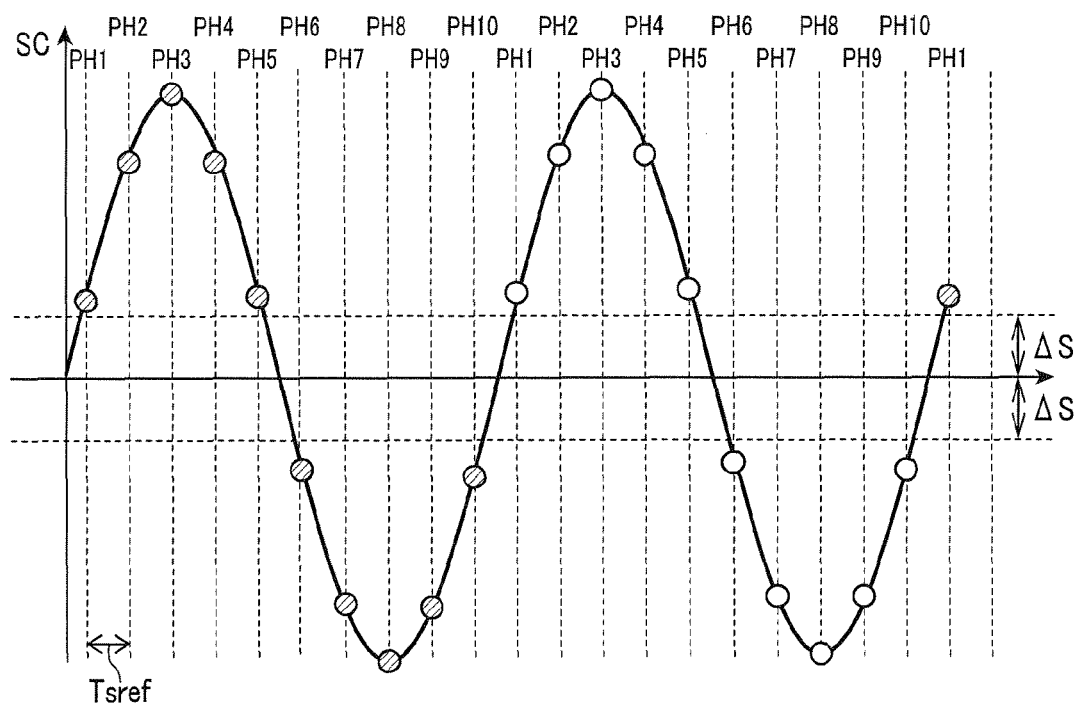
FIG. 2 is a view showing a timing chart of sampling excitation signals used by the position detection device according to the first exemplary embodiment of the present invention.

In order to solve the above problem caused by the phenomenon of the imbalance, the position detection device according to the first exemplary embodiment uses a sampling timing of the input excitation signal SC shown in FIG. 2. FIG. 2 is a view showing a timing chart of sampling excitation signals used by the position detection device according to the first exemplary embodiment of the present invention. As shown in FIG. 2, the sampling time (or the sampling timing), at which the input excitation signal SC is sampled, is fixed to a reference sampling period Tsref, and a phase thereof (namely, the phase of the AC excitation signal Sc at the sampling time) is adjusted in order to satisfy the following conditions.

(First Condition)

In the first condition, the sampling number of samples during a period when the excitation signal SC has a positive value is equal to the sampling number of samples during a period when the input excitation signal SC has a negative value. In other words, the sampling number of samples during the positive period (namely, during phases PH1 to PH5 shown in FIG. 2) is controlled to be equal to the sampling number of samples during the negative period (namely, during phases PH6 to PH10 shown in FIG. 2).

(Second Condition)

In the second condition, an absolute value of the input excitation signal SC to be sampled is not less than the regulated ΔS. The second condition is a condition to avoid a detection error. The regulated ΔS is a value which is more than a changed value of the input excitation signal SC during a time difference between the sampling time of the input excitation signal SC by the AD converter 46 and the sampling time of the modulated wave signals SIN and COS.

The second condition can be realized when a phase of the AC excitation signal Sc has a same value in a sampling time every one period of the AC excitation signal Sc by adjusting the reference sampling period Tsref and the sampling phase. That is, because the sampling phase (the phase of the AC excitation signal Sc at a sampling time) is changed according to a time elapse when the second condition is not satisfied, there is a possibility of the second condition being difficult to satisfy. The position detection device according to the first exemplary embodiment has a sampling time setting section.

When the second condition is satisfied, it is possible to avoid an occurrence of the imbalance as previously described and to increase the noise immunity caused by various matters excepting the imbalance phenomenon. That is, because the detection signal Rd becomes a value of 1 when the AC excitation signal Sc is zero, the imbalance is easily generated by executing the sampling when the input excitation signal SC has a value of zero.

On the other hand, the demodulation prohibition section in the position detection device according to the first exemplary embodiment which satisfies the second condition prohibits the sampling of the input 2a excitation signal SC when the input excitation signal SC has a value of zero. Although the reference signal REF has a sign opposite to the sign of the AC excitation signal Sc caused by noises, this is almost never occurs when a value of the input excitation signal SC is increased. Accordingly, satisfying the second condition can increase the noise immunity.

Second Exemplary Embodiment

A description will be given of the position detection device according to a second exemplary embodiment with reference to FIG. 3 and FIG. 4.

The difference between the second exemplary embodiment and the first exemplary embodiment will be explained. The same components, action and effects between the second exemplary embodiment and the first exemplary embodiment are omitted here for brevity.

Using the sampling period and the phase of the input excitation signal SC shown in FIG. 2 makes it possible to avoid an occurrence of the imbalance and the detection error previously described. When the sampling period and the phase of the input excitation signal SC are fixed, it becomes difficult to obtain the effects because the period of the AC excitation signal Sc is fluctuated by some reason due to the ambient temperature. This means that the phase of the input excitation signal SC at the sampling time (or the sampling timing) becomes different from the phase shown in FIG. 2. The position detection device according to the second exemplary embodiment solves this problem.

Figure 3:
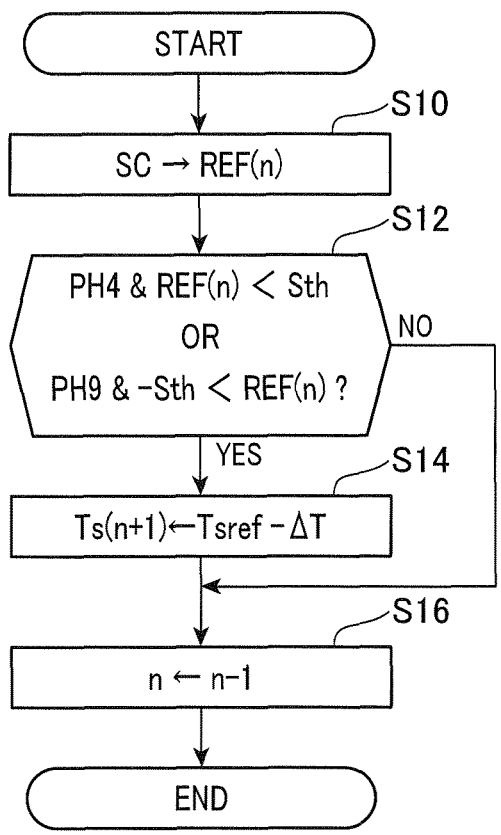
FIG. 3 is a view showing a timing chart of changing a sampling time of an input excitation signal SC by the position detection device according to a second exemplary embodiment of the present invention.

FIG. 3 is a view showing a timing chart of changing a sampling time of the input excitation signal SC by the position detection device according to the second exemplary embodiment of the present invention. The CPU 50 in the position detection device according to the second exemplary embodiment periodically executes the process shown in FIG. 3 at a predetermined time interval. The process shown in FIG. 3 forms a sampling time changing section.

In step S10 in the flow chart shown in FIG. 3, the CPU 50 samples the input excitation signal SC. The operation flow goes to step S12.

In step S12, the CPU 50 detects whether or not a logical sum of the following conditions (a) and (b) is true.

Condition (a): The current sampling time (or the current sampling timing) corresponds to the phase PH4 shown in FIG. 2, and the sample value (the reference value REF(n)) at the current sampling time is less than a threshold value Sth (>0).

Condition (b): The current sampling time (or the current sampling timing) corresponds to the phase PH9 shown in FIG. 2 and the sample value (the reference value REF(n)) at the current sampling time is more than a value of −Sth which is the additive inverse of the threshold value Sth (>0).

The threshold value Sth is smaller than the value of the reference signal REF at the phase PH4 shown in FIG. 2. In particular, the CPU 50 uses the threshold value Sth which is not more than an upper limit value at which there is a possibility that the value of the reference signal REF is not more than the regulated value ΔS. On the basis of the condition (a) and the condition (b) it is possible to judge whether or not an absolute value of the reference signal REF at a next sampling time is not more than the regulated ΔS when the current sampling time is advanced from a predicted phase of the AC excitation signal Sc.

When the detection result in step S12 indicates affirmation ("YES" in step S12), the operation flow goes to step S14.

In step S14, the CPU 50 determines the next sampling period Ts (n+1) so that the next sampling period TS (n+1) is shorter than the reference sampling period Tsref by a regulated value ΔT.

Figure 4:
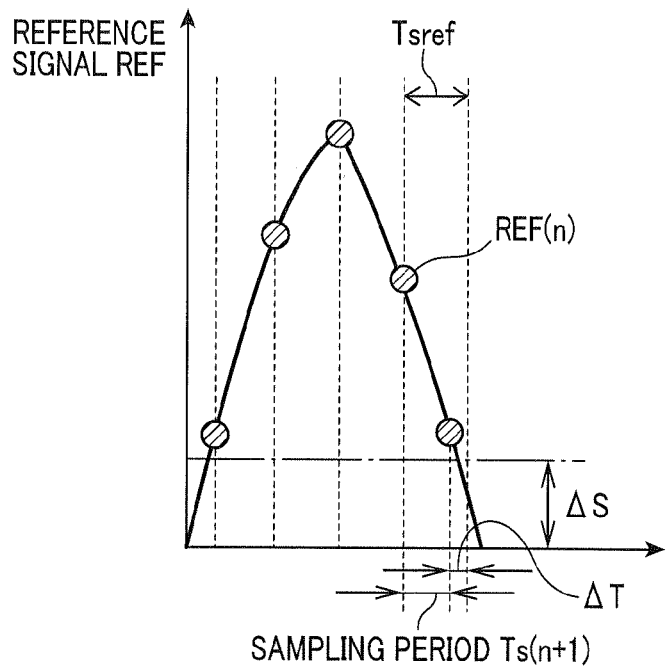
FIG. 4 is a view showing an example of changed sampling times of an input excitation signal SC by the position detection device according to the second exemplary embodiment of the present invention.

FIG. 4 is a view showing changed sampling times (or the sampling timings) of the input excitation signal SC by the position detection device according to the second exemplary embodiment of the present invention. As shown in FIG. 4, when the next sampling period Ts(n+1) is decreased by the predetermined value ΔT, it is possible to avoid that an absolute value of the next sampling value (as the reference signal REF(n+1)) is not more than the regulated value ΔS.

It is possible to use a fixed value as the regulated value ΔT. However, the concept of the present invention is not limited by this value. For example, it is possible to use a variable which is changed due to a value of the reference signal REF. In this case, it is possible to obtain an elapse of time from the time when the input excitation signal SC is equal to the reference signal REF to the time when the input excitation signal SC becomes not more than the regulated value ΔS on the basis of the amplitude information of the input excitation signal SC. Accordingly, when the regulated value ΔT is adjusted due to a value of the reference signal REF(n), it is possible to certainly avoid that the next reference signal REF(n+1) is not more than the regulated value ΔS during the next sampling period T (n+1), and to obtain the condition in which the next sampling period T (n+1) corresponds to the time corresponding to the predicted phase of the AC excitation signal Sc.

When the CPU 50 completes the process in step S14 or the detection result in step S12 indicates negation ("NO" in step S12), the operation flow goes to step S16.

In step S16, a variable n is incremented by one (n←n+1), and the CPU 50 completes the process shown in FIG. 3.

Third Exemplary Embodiment

A description will be given of the position detection device according to a third exemplary embodiment with reference to FIG. 5.

The difference between the third exemplary embodiment and the second exemplary embodiment will be explained. The same components, action and effects between the third exemplary embodiment and the second exemplary embodiment are omitted here for brevity.

The position detection device according to the fourth exemplary embodiment changes the sampling phase of the next sampling step when an absolute value of the reference signal REF becomes not more than the regulated value ΔS.

Figure 5:
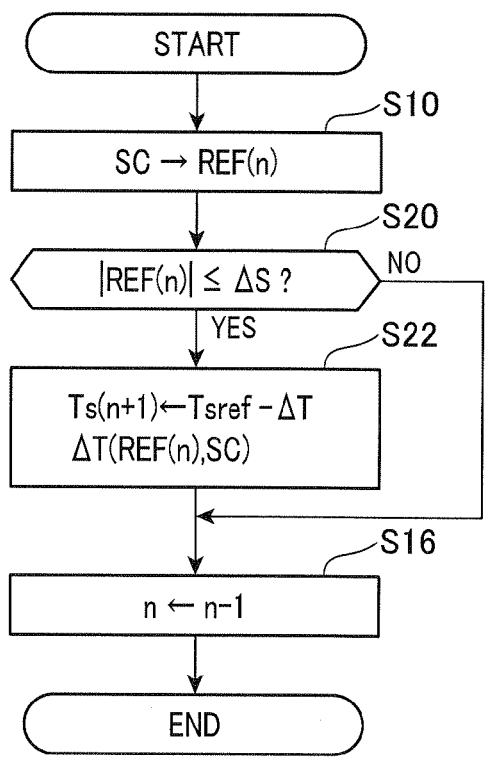
FIG. 5 is a view showing a timing chart of changing a sampling phase by the position detection device according to a third exemplary embodiment of the present invention.

FIG. 5 is a view showing a timing chart of changing the sampling phase by the position detection device according to the third exemplary embodiment. The CPU 50 in the position detection device according to the third exemplary embodiment repeatedly executes the process shown in FIG. 5. The same steps between the process shown in FIG. 5 and the process shown in FIG. 3 will be referred to with the same reference characters, and the explanation for the same steps is omitted here for brevity.

After the completion of execution of the step S10 in the flow chart shown in FIG. 5, the operation goes to step S20.

In step S20, the CPU 50 judges whether or not an absolute value of the reference signal REF is not more than the regulated value ΔS. When the detection result in step S20 indicates affirmation ("YES" in step S20), the operation flow goes to step S22.

In step S22, the CPU 50 subtracts the reference sampling period Tsref by the regulated value ΔT. The subtraction result is used as the next sampling period Ts(n+1). The process in step S22 produces the condition in which the reference signal REF exceeds the regulated value ΔS when reference sampling period Tsref is used as the sampling period Ts at the time after next. That is, when the detection result in step S20 indicates affirmation ("YES" in step S20), it can be considered that the sampling phase of the AC excitation signal Sc at the sampling time is shifted from the sampling phase which is defined and shown in FIG. 2 for some reason. Such a phase gap is adjusted in order to obtain the sampling time every reference sampling period Tsref. The process to adjust such a phase gap forms a sampling phase changing section.

The regulated value ΔT is adjusted according to the amplitude of each of the reference signal REF(n) and the input excitation signal SC. That is, the CPU 50 adjusts the regulated value ΔT on the basis of the magnitude of the calculated gap because calculating the gap in sampling time on the basis of the amplitude of each of the reference signal REF(n) and the input excitation signal SC. A sin of the regulated value ΔT has either a positive value or a negative value.

Fourth Exemplary Embodiment

A description will be given of the position detection device according to a fourth exemplary embodiment with reference to FIG. 6.

The difference between the fourth exemplary embodiment and the third exemplary embodiment will be explained. The same components, action and effects between the fourth exemplary embodiment and the third exemplary embodiment is omitted here for brevity.

In the third exemplary embodiment as previously described the regulated value ΔT is adjusted on the basis of the current sample value (reference signal REF(n)). On the other hand, the fourth exemplary embodiment adjusts the regulated value ΔT by using the sample value (reference signal REF) when the absolute value of the reference signal REF(n) is not more than the regulated value ΔS, and the next sample value (reference signal REF(n+1)).

Figure 6:
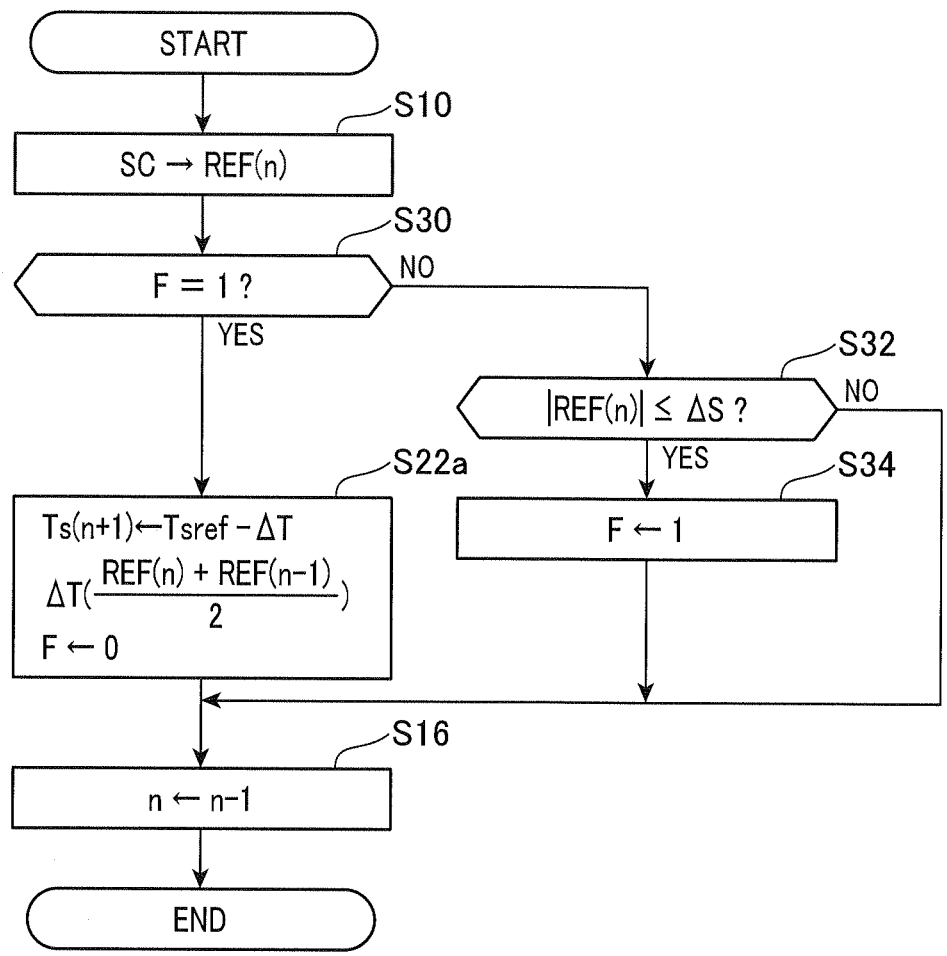
FIG. 6 is a view showing a timing chart of changing a sampling phase by the position detection device according to a fourth exemplary embodiment of the present invention.

FIG. 6 is a view showing a timing chart of changing the sampling phase (or the sampling timing) by the position detection device according to the fourth exemplary embodiment. The CPU 50 in the position detection device according to the fourth exemplary embodiment periodically executes the process shown in FIG. 6 at a predetermined interval. The same steps between the process shown in FIG. 6 and the process shown in FIG. 3 will be referred to with the same reference characters, and the explanation for the same steps is omitted here for brevity.

After the completion of execution of the step S10 in the flow chart shown in FIG. 6, the operation goes to step S30.

In step S30, the CPU 50 detects whether or not the flag F has a value of 1. The flag F indicates that an absolute value of the reference signal REF becomes not more than the regulated value ΔS. When the detection result in step S30 indicates affirmation ("YES" in step S30), the operation flow goes to step S32.

In step S32, the CPU 50 detects whether or not an absolute value of the reference signal REF(n) is not more than the regulated value ΔS. When the detection result in step S32 indicates affirmation ("YES" in step S32), the operation flow goes to step S34.

In step S34, the CPU 50 sets the flag F to a value of 1.

On the other hand, when the detection result in step S30 indicates negation ("NO" in step S30), the operation flow goes to step S22a.

In step S22a, the CPU 50 subtracts the reference sampling period Tsref by the regulated value ΔT. The subtraction result is used as the next sampling period Ts(n+1). Further, the CPU 50 sets the flag F to a value of 0.

The regulated value ΔT is adjusted on the basis of an average value between the current sampling value (reference signal REF(n)) and the previous sampling value (reference signal REF(n−1)). This means that an average value of the sampling values becomes zero so long as the sampling time of the input excitation signal SC shown in FIG. 2 is satisfied or kept. That is, a difference between the average value and a value of 0 and a time length counted from the sampling time shown in FIG. 2 correlate to each other. For this reason, when the regulated value ΔT is adjusted so as to decrease the above difference, it is possible to compensate the gap shifted from the sampling time shown in FIG. 2.

It is preferable for the CPU 50 in the position detection device to adjust the regulated value ΔT on the basis of the amplitude information of the input excitation signal SC in addition to the difference between the average value and a value of 0 and a time length counted from the sampling time shown in FIG. 2.

Fifth Exemplary Embodiment

A description will be given of the position detection device according to a fifth exemplary embodiment with reference to FIG. 6.

The difference between the fifth exemplary embodiment and the third exemplary embodiment will be explained. The same components, action and effects between the third exemplary embodiment and the first exemplary embodiment is omitted here for brevity.

As previously described, the CPU 50 in the position detection device according to the third exemplary embodiment considers that the sampling phase of the AC excitation signal Sc is shifted from a correct sampling phase for some reason when an absolute value of the reference signal REF becomes not more than the regulated value ΔS. In addition, there are various reasons in which the phase of the AC excitation signal Sc is shifted from the regulated period. For example, there is a reason in which the phase of the AC excitation signal Sc is shifted from the regulated period by the fluctuation of a temperature of the built-in oscillator 42. In this phenomenon, even if the sampling phase is adjusted, there is still a possibility that an absolute value of the reference signal REF is not more than the regulated value ΔS. The fifth exemplary embodiment solves such a problem.

Figure 7:
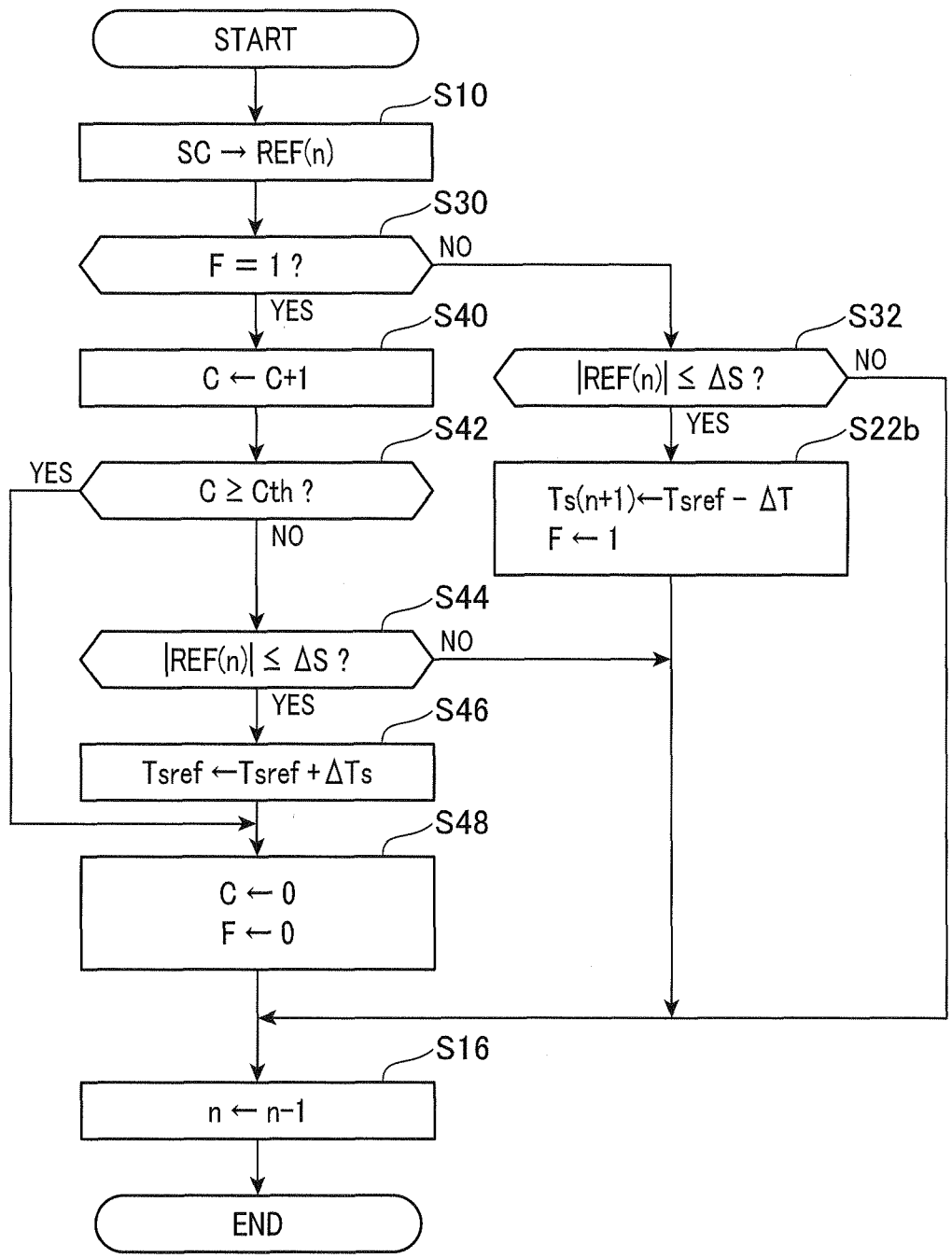
FIG. 7 is a view showing a timing chart of changing a sampling period by the position detection device according to a fifth exemplary embodiment of the present invention.

FIG. 7 is a view showing a timing chart of changing the sampling period by the position detection device according to the fifth exemplary embodiment. The CPU 50 in the position detection device according to the fifth exemplary embodiment repeatedly executes the process shown in FIG. 7. The same steps between the process shown in FIG. 7 and the process shown in FIG. 3 will be referred to with the same reference characters, and the explanation for the same steps is omitted here for brevity.

After the completion of execution of the step S10 in the flow chart shown in FIG. 7, the operation goes to step S30.

In step S30, the CPU 50 detects whether or not the flag F has a value of 1. The flag F indicates that an absolute value of the reference signal REF becomes not more than the regulated value ΔS. When the detection result in step S30 indicates negation ("NO" in step S30), the operation flow goes to step S32.

In step S32, the CPU 50 detects whether or not an absolute value of the reference signal REF(n) is not more than the regulated value ΔS. When the detection result in step S32 indicates affirmation ("YES" in step S32), the operation flow goes to step S22b.

In step S22b, the CPU 50 obtains the next sampling period Ts(n+1) by subtracting the reference sampling period Tsref by the regulated value ΔT. That is, the subtraction result is used as the next sampling period Ts(n+1). Further, the CPU 50 sets the flag F to a value Of 1.

On the other hand, when the detection result in step S30 indicates affirmation ("YES" in step S30), the operation flow goes to step S40.

In step S40, the CPU 50 increments a value of a counter C. The counter C counts an elapse of time counted from a time when an absolute value of the reference signal REF becomes not more than the regulated value ΔS. The operation flow goes to step S42.

In step S42, the CPU 50 detects whether or not a value of the counter C is not less than a threshold value Cth. The detection in step S42 judges whether or not the execution of the process in step S22b is effective. The threshold value Cth is set to a time at which the absolute value of the reference signal REF is not more than the regulated value ΔS again when the execution of the process in step S22b becomes effective.

When the detection result in step S42 indicates negation ("NO" in step S42), the operation flow goes to step S44.

In step S44, the CPU 50 detects whether or not an absolute value of the reference signal REF(n) is not more than the regulated value ΔS. When the detection result in step S44 indicates affirmation ("YES" in step S44), the operation flow goes to step S46.

In step S46, the CPU 50 adjusts the reference sampling period Tsref by the regulated value ΔTs. The regulated value ΔTs can have a value either a positive value or a negative value. It is possible that a sign and a magnitude of the regulated value ΔTs is set on the basis of time series data items of the reference signal REF after a value of the flag F is set to a value of 1. The process in step S46 forms a period changing section.

When the process in step S46 is completed or the detection result in step S42 indicates affirmation (YES" in step S42), the operation flow goes to step S48.

In step S48, the CPU 50 sets the counter C to a value of 0, and sets the flag F to a value of 0.

Sixth Exemplary Embodiment

A description will be given of the position detection device according to a sixth exemplary embodiment with reference to FIG. 8.

The difference between the sixth exemplary embodiment and the third exemplary embodiment will be explained. The same components, action and effects between the third exemplary embodiment and the first exemplary embodiment is omitted here for brevity.

The CPU 50 in the position detection device according to the sixth exemplary embodiment prohibits a calculation process (demodulation process) of the calculated angle φ using the reference signal REF when an absolute value of the reference signal REF becomes not more than the regulated value ΔS.

Figure 8:
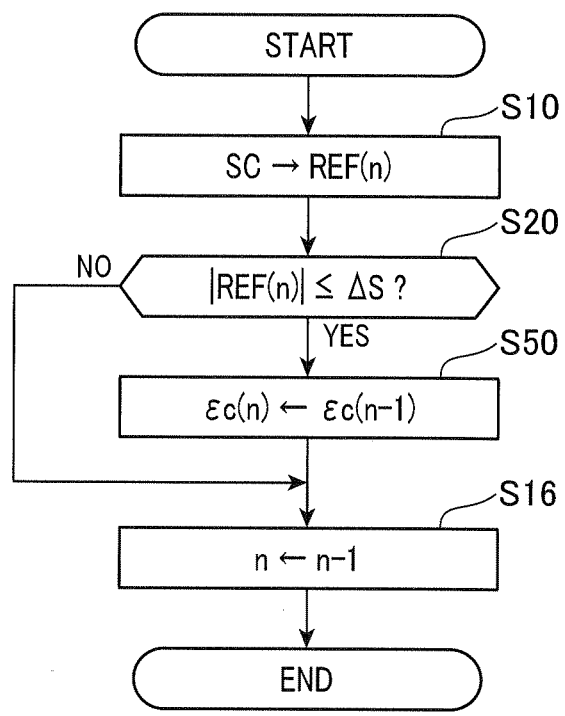
FIG. 8 is a view showing a timing chart of executing a demodulation prohibition process by the position detection device according to a sixth exemplary embodiment of the present invention.

FIG. 8 is a view showing a timing chart of executing the demodulation prohibition process by the position detection device according to the sixth exemplary embodiment. The CPU 50 periodically executes the process shown in FIG. 8. The same steps between the process shown in FIG. 8 and the process shown in FIG. 3 will be referred to with the same reference characters, and the explanation for the same steps is omitted here for brevity.

In step S20 in the flow chart shown in FIG. 8, the CPU 50 detects whether or not an absolute value of the reference signal REF(n) is not more than the regulated value ΔS. When the detection result in step S20 indicates affirmation ("YES" in step S20), the operation flow goes to step S50.

In step S50, the CPU 50 sets the current detected value ϵc(n) to the previous detected value ϵc(n−1). This makes it possible to prohibit the calculation process (demodulation process) of the calculated value φ using the reference signal REF(n). The process in step S50 forms a demodulation prohibition section.

(Other Modifications)
(Sampling Time Setting Section (Shown in FIG. 2))

The first exemplary embodiment, as shown in FIG. 2, discloses the pattern of the same interval of the sampling time (or the sampling timing) in order to avoid the sampling of the input excitation signal SC, etc. when an absolute value of the input excitation signal SC becomes not more than the regulated value ΔS. However, the concept of the present invention is not limited by this. For example, it is possible to have the pattern of the same interval of the sampling time excepting the interval overlapped with an absolute value of the input excitation signal SC (or reference signal REF) of being not more than the regulated value ΔS. This case makes it possible to improve the frequency of sampling in the area in which an absolute value of the reference signal REF becomes more than the regulated value ΔS.

(Timing Changing Section (Shown in FIG. 3))

The second exemplary embodiment discloses the process of changing the sampling time (or the sampling timing) shown in FIG. 3. However, the concept of the present invention is not limited by the second exemplary embodiment. For example, it is possible to decrease the time interval to the next sampling time (which corresponds to the phase PH4) when it is judged that the sampling time is advanced from the correct sampling time on the basis of the sampling value (reference signal REF) which corresponds to the phase PH3 shown in FIG. 2, for example. Still further, it is possible to increase the time interval to next sampling times (which corresponds to the phase PH1 and PH6) when it is judged that the sampling time is delayed from the correct sampling time on the basis of the judgment in which the sampling time is delayed in a retard angle because the absolute values of the sampling values (reference signal REF), which corresponds to the phases PH5 and PH10 shown in FIG. 2, are extremely large.

(Period Changing Section (as the Process in Step S46 Shown in FIG. 7)

The fifth exemplary embodiment discloses the process of changing the reference sampling period Tsref, as shown in FIG. 7, when an absolute value of the reference signal REF is not more than the regulated value ΔS. However, the concept of the present invention is not limited by this. For example, it is possible to change the reference sampling period Tsref again when an absolute value of the reference signal REF is not more than the regulated value ΔS after the completion of execution twice of the sampling phase changing process.

Further, it is possible to judge whether or not the sampling period is changed on the basis of a difference between the previous reference signal REF and the current reference signal REF when an absolute value of the reference signal REF is not more than the regulated value ΔS. In this case, it is possible to change the sampling period only when the detection result indicates the occurrence of the change of the sampling period.

(Sampling Phase Changing Section)

The third exemplary embodiment, etc. disclose the process of changing the sampling phase immediately following an absolute value of the reference signal REF is not more than the regulated value ΔS. However, the concept of the present invention is not limited by this. For example, it is possible to use, as the target of changing a sampling phase, the first sampling time (or the first sampling timing at PH1) in the sampling period shown in FIG. 2.

(Demodulation Prohibition Section)

The sixth exemplary embodiment shown in FIG. 8 discloses the demodulation prohibition section for setting the current detected value ϵc(n) to the previous detected value ϵc(n−1) in order to prohibit the use of the reference signal in the demodulation when an absolute value of the reference signal REF is not more than the regulated value ΔS. However, the concept of the present invention is not limited by this. For example, it is possible to prohibit the calculation of the calculated angle φ during this sampling period.

(Avoidance Section)

It is possible to add a period detection section and a sampling period changing section in addition to the sampling time setting section. The period detecting section detects the period of the AC excitation signal Sc, and the sampling period changing section changes the sampling period when the detected period of the AC excitation section is shifted from a reference value of one period. The period changing section avoids a difference occurring between the predicted AC excitation signal Sc predicted by the sampling time setting section and the actual AC excitation signal Sc. Further, it is possible to detect a fluctuation of the AC excitation signal Sc and change the sampling period of the AC excitation signal Sc in order to avoid the fluctuation of the AC excitation signal Sc. However, the concept of the present invention is not limited by this. For example, it is possible to detect the fluctuation of the AC excitation signal Sc and change the sampling phase.

(Binary Detection Signal Calculation Section as the Detection Signal Generation Section 58)

The detection signal generation section 58 in the position detection device according to the first to fourth exemplary embodiments calculates a binary detection signal R on the basis whether or not the AC excitation signal Sc is not less than zero. However, the concept of the present invention is not limited by this structure. For example, it is possible that the detection signal generation section 58 calculates the binary detection signal R on the basis whether or not the AC excitation signal Sc is more than zero.

(Detection Section)

The synchronous detection section 60 in the position detection device according to the first to fourth exemplary embodiment uses the detection signal Rd generated by the detection signal generation section 58 as the binary detection signal generation section. However, the concept of the present invention is not limited by this structure. For example, it is possible for the synchronous detection section 60 to use a detected value $\epsilon c$ obtained by multiplying the reference signal REF by the error correlation value $\epsilon$, and to eliminate an influence of a sign of the AC excitation signal Sc from the error correlation value $\epsilon$.

(Analogue to Digital Converter)

The first to fourth exemplary embodiments use the AD converter 46 to convert the modulated wave signal SIN, the modulated wave signal COS and the input excitation signal SC to digital data items. However, the concept of the present invention is not limited by this structure. It is possible to use plural conversion sections, for example, one conversion section converts the modulated wave signal SIN and the modulated wave signal COS to digital data items, and another conversion section converts the input excitation signal SC to digital data items. Instead of this example, it is also possible to use three conversion sections which convert the modulated wave signal SIN, the modulated wave signal COS and the input excitation signal SC, respectively. In other words, it is possible that the excitation signal sampling section and the modulated wave sampling section use different analogue to digital converters, respectively.

(Demodulation Section)

(a) Error Correlation Value $\epsilon$

The position detection device according to the first exemplary embodiment having a structure shown in FIG. 1 uses the error correlation value $\epsilon$ having a sign, from which an influence caused by a sign of the AC excitation signal Sc is eliminated, and the sign of the error correlated value $\epsilon$ corresponds to a shifted direction of the calculated angle $\phi$ against the rotation detection angle $\theta$ of the rotor 10a of the motor generator 10. However, the concept of the present invention is not limited by this structure. For example, it is possible to use a value which is a sum of a first value and a second value where the first value is obtained by multiplying the modulated wave signal COS with $\cos(\phi-\pi/2)$, and the second value is obtained by multiplying the modulated wave signal SIN with $\sin(\phi-\pi/2)$. In this case, the error correlation value $\epsilon$ becomes a value which is proportional to $\sin \omega t \cos(\theta-\phi+\pi/2)$. Because of being free from the influence caused by a sign of the excitation signal $\sin \omega t$, the error correlation value $\epsilon$ becomes a positive value when the calculated angle $\phi$ is advanced from the rotation detection angle $\theta$, and the error correlation value $\epsilon$ becomes a negative value when the calculated angle $\phi$ is retarded or delayed from the rotation detection angle $\theta$.

When an influence caused by a sign of the AC excitation signal Sc is eliminated from the error correlation value $\epsilon$, it is not always necessary for the error correlation value $\epsilon$ to have a sign corresponding to a direction of the calculated angle calculated angle $\phi$ against the rotation detection angle $\theta$ of the rotor 10a of the motor generator 10. For example, it is possible to obtain the error correlation value $\epsilon$ by adding a first value and a second value where the first value is obtained by multiplying the modulated wave signal COS with $\cos(\phi-\pi/4)$ and the second value is obtained by multiplying the modulated wave signal SIN with $\sin \omega t \cos(\theta-\phi+\pi/4)$. In this case, the error correlation value $\epsilon$ becomes a value which is proportional to $\sin \omega t \cos(\theta-\phi+\pi/4)$. Even if the error correlation value $\epsilon$ is eliminated from the influence caused by a sign of the excitation signal Sc, the error correlation value $\epsilon$ does not have a sign corresponding to one of an advanced direction and a retarded direction of the calculated angle $\phi$ against the rotation detection angle $\theta$ of the rotor 10a.

However, when a control error is determined on the basis of a difference between the detected value $\epsilon c$ and $K/\sqrt{2}$ (where the influence caused by a sign of the AC excitation signal Sc is eliminated from the detected value $\epsilon c$, and K is an amplitude of the modulated wave signal determined by a gain of the differential amplifier circuit 34, etc.), the control error becomes a value having a sign corresponding to the direction to which the calculated angle $\phi$ is shifted from the rotation detection angle $\theta$ of the rotor 10a of the motor generator 10. It is therefore possible to calculate the calculated angle $\phi$ as an operation value of the feedback control for the control error to be made zero. In this case, it is effective to use the imbalance avoidance section in order to increase the noise immunity.

However, the above measure indicates how to define the error correlation value $\epsilon$ only. That is, if the value of $\epsilon-K \sin \omega t/\sqrt{2}$ is used as the error correlation value $\epsilon$, the value of $\epsilon-K \sin \omega t/\sqrt{2}$ becomes a value having a sin corresponding to the direction of the calculated angle $\phi$ shifted from the rotation detection angle $\theta$ of the rotor 10a of the motor generator 10 when the influence caused by the sign of the AC excitation signal Sc is eliminated from the error correlation value $\epsilon$.

The value obtained by eliminating the influence caused by an absolute value of the AC excitation signal Sc from the value of $\epsilon-K \sin \omega t/\sqrt{2}$ corresponds to a difference between the rotation detection angle $\theta$ and the calculated angle $\phi$. However, this value has a different absolute value when the calculated angle $\phi$ is an advanced angle or a retarded angle even if having a same error value. Because a gain used in the feedback control of the calculated angle $\phi$ becomes a different value in an advanced angle and a retarded angle, it is preferable to use the position detection device according to the exemplary embodiments in a system which allows this difference of the gain.

(b) Process of Calculating Calculated Angle $\phi$

The concept of the present invention is not limited by the process of inputting the detected value $\epsilon c$ and outputting the calculated angle $\phi$ previously described. It is possible to execute a process using three or more integral sections. For example, three integral sections execute a calculation of triple integrals.

Further, it is possible to have a single integral section. In this case, the more the frequency of the sampling is decreased, the more the calculation accuracy of the calculated angle $\phi$ when a detection error is caused when an absolute value of the AC excitation signal Sc becomes not more than the regulated value $\Delta S$. That is, the interval of the execution of the integral process is increased when the frequency of sampling is decreased, and a magnitude of the influence of noises to the calculated angle $\phi$ (namely, the gain of the calculated angle $\phi$ against noises) is increased.

(c) Structure of the Position Detection Device

The position detection device according to the first to fourth exemplary embodiments uses the CPU 50 which executes software programs in order to realize the various functions previously described. However, the concept of the present invention is not limited by this structure. For example, it is possible to use hardware devices to realize those functions because there is no difference in use between the software programs and the hardware devices from a point of view in which the noise immunity is decreased or deteriorated by a difference between the sampling number of samples when the excitation signal Sc has a positive sign and the sampling number of samples when the excitation signal Sc has a negative sign when the frequency of sampling of the input excitation signal SC to be used for demodulation is decreased.

(Target in Position Detection)

The first to fourth exemplary embodiments detect a position of the rotation detection angle of the rotor 10a of the motor generator 10. However, the concept of the present invention is not limited by this structure. For example, it is possible for the position detection device according to the present invention to detect various target position so long as the amplitude modulation of the excitation signal can be executed on the basis of position information.

(Position Information)

The first to fourth exemplary embodiments use position information in a system of rotating axis, namely, in rotational coordinates. However, the concept of the present invention is not limited by this structure. For example, it is possible to use position information provided from a sensor of a direct driven type using the same principle of such a system of rotating axis.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A position detection device comprising:
   a computer system, including a central processing unit (CPU), the computer system being configured to provide a demodulation section for receiving a modulated wave signal which is obtained by an amplitude modulation of an alternating current excitation signal on the basis of position information of a target detection device to be detected, and demodulating the position information from the modulated wave signal by using a plurality of sampling values of the modulated wave signal during a period of the alternating current excitation signal, and
   the demodulation section comprising:
   an alternating current excitation signal sampling section configured to sample the alternating current excitation signal so that the number of the alternating current excitation signals sampled during a first period in which alternating current excitation signals has a positive value is equal to the number of the alternating current excitation signal during a second period in which the alternating current excitation signal has a negative value;
   a detection section configured to receive an output of the alternating current excitation signal sampling section, and execute an eliminating process of eliminating an influence caused by a sign of the alternating current excitation signal from the position information when the position information is demodulated from the received modulated wave signal; and
   an avoidance section configured to avoid using the alternating current excitation signal having not more than a regulated value in the demodulation of the position information,
   wherein the regulated value is more than a changed value of the alternating current excitation signal during a time difference between a sampling time of the alternating current excitation signal sampled by the alternating current excitation signal sampling section and the sampling time of the modulated wave signals.

2. The position detection device according to claim 1, wherein the alternating current excitation signal sampling section periodically executes the sampling of the alternating current excitation signal on the basis of a pattern of a predetermined sampling interval, and the avoidance section comprises a sampling time setting section configured to set the pattern of the predetermined sampling interval so that the sampling time does not contain a sampling time at which an absolute value of the alternating current excitation signal is not more than a regulated value.

3. The position detection device according to claim 1, wherein the avoidance section comprises a sampling time changing section configured to adjust a next sampling time on the basis of the sampling result of the alternating current excitation signal sampling section so that the sampling time does not contain a sampling time at which an absolute value of the alternating current excitation signal is not more than a regulated value.

4. The position detection device according to claim 1, wherein the avoidance section comprises a period changing section configured to change the sampling period when an absolute value of the alternating current excitation signal sampled by the alternating current excitation signal sampling section is not more than a regulated value.

5. The position detection device according to claim 1, wherein the avoidance section comprises a sampling phase changing section configured to change a sampling phase when an absolute value of the alternating current excitation signal sampled by the alternating current excitation signal sampling section is not more than a regulated value.

6. The position detection device according to claim 5, wherein the sampling phase changing section changes the sampling phase on the basis of the alternating current excitation signal, which is not more than the regulated value, sampled by the alternating current excitation signal sampling section.

7. The position detection device according to claim 5, wherein the sampling phase changing section changes the sampling phase on the basis of a pair of sampled values of the alternating current excitation signals, which is close to zero, sampled by the alternating current excitation signal sampling section.

8. The position detection device according to claim 5, wherein the sampling phase changing section changes the sampling phase on the basis of a pair of sampled values of the alternating current excitation signals sampled by the alternating current excitation signal sampling section.

9. The position detection device according to claim 1, wherein the avoidance section comprises a demodulation prohibition section configured to prohibit that the demodulation of the position information uses the sampled value of the alternating current excitation signal when an absolute value of the alternating current excitation signal sampled by the alternating current excitation signal sampling section is not more than a regulated value.

10. The position detection device according to claim 1, wherein the detection section comprises a binary detection signal calculation section configured to generates a binary detection signal of the alternating current excitation signal, and the detection section executes the eliminating process on the basis of the calculated binary detection signal.

11. The position detection device according to claim 10, wherein the binary detection signal calculation section generates a binary detection signal of the alternating current excitation signal on the basis of one of:
   whether or not a value of the alternating current excitation signal is not less than zero; and
   whether or not a value of the alternating current excitation signal exceeds zero.

12. The position detection device according to claim 1, wherein the demodulation section comprises a modulated wave signal sampling section configured to sample the modulated wave signal, and
   the alternating current excitation signal sampling section and the modulated wave signal sampling section in the demodulation section is realized by an analogue to digital conversion section configured to convert the modulated wave signal and the alternating current excitation signal to digital data items in time division.

13. The position detection device according to claim 1, wherein the demodulation section is a software program execution section configured to execute a software program in order to realize the function of the demodulation section.

14. The position detection device according to claim 1, wherein the computer system is further configured to detect a position of a rotation detection angle of the target detection device based on a detected value output from the detection section.

15. The position detection device according to claim 1, wherein the computer system is further configured to output a control value to the target detection device to control the target detection device based on a detected value output from the detection section.

16. An apparatus comprising:
   a computer system, including a central processing unit (CPU), the computer system being configured to:
   receive a modulated wave signal which is obtained by an amplitude modulation of an alternating current excitation signal on the basis of position information of a target detection device to be detected; and
   demodulate the position information from the modulated wave signal by using a plurality of sampling values of the modulated wave signal during a period of the alternating current excitation signal;
   wherein, to demodulate the position information, the computer system is further configured to:
      sample the alternating current excitation signal so that the number of the alternating current excitation signals sampled during a first period in which alternating current excitation signals has a positive value is equal to the number of the alternating current excitation signal during a second period in which the alternating current excitation signal has a negative value;
      process the sampled alternating current excitation signal, and execute an eliminating process of eliminating an influence caused by a sign of the alternating current excitation signal from the position information when the position information is demodulated from the modulated wave signal; and
      avoid using the alternating current excitation signal having not more than a regulated value in the demodulation of the position information; and
   wherein the regulated value is more than a changed value of the alternating current excitation signal during a time difference between a sampling time of the sampled alternating current excitation signal and the sampling time of the modulated wave signals.

17. The apparatus according to claim 16, wherein:
   the target detection device comprises a rotor; and
   the computer system is further configured to detect a position of a rotation detection angle of the rotor based on a detected value determined based on the processing of the sampled alternating current excitation signal and the execution of the eliminating process.

18. The apparatus according to claim 16, wherein:
   the target detection device comprises a rotor device; and
   the computer system is further configured to output a control value to the rotor device to control the rotor device based on a detected value determined based of the processing of the sampled alternating current excitation signal and the execution of the eliminating process.

* * * * *